United States Patent
Pappu

(10) Patent No.: US 10,346,265 B2
(45) Date of Patent: Jul. 9, 2019

(54) PROTOCOL AWARE TESTING ENGINE FOR HIGH SPEED LINK INTEGRITY TESTING

(71) Applicant: Intel Corporation, Santa Clara, CA (US)

(72) Inventor: Lakshminarayana Pappu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 214 days.

(21) Appl. No.: 15/283,401

(22) Filed: Oct. 1, 2016

(65) Prior Publication Data

US 2018/0095844 A1 Apr. 5, 2018

(51) Int. Cl.
| | |
|---|---|
| *G06F 11/00* | (2006.01) |
| *G06F 11/16* | (2006.01) |
| *G06F 11/27* | (2006.01) |
| *G06F 13/40* | (2006.01) |
| *G06F 11/22* | (2006.01) |
| *G06F 11/30* | (2006.01) |

(52) U.S. Cl.
CPC ...... *G06F 11/1625* (2013.01); *G06F 11/2268* (2013.01); *G06F 11/27* (2013.01); *G06F 11/3051* (2013.01); *G06F 13/4022* (2013.01)

(58) Field of Classification Search
CPC combination set(s) only.
See application file for complete search history.

(56) References Cited

U.S. PATENT DOCUMENTS 8,805,636 B2 * 8/2014 Conner ............... G06F 11/2733
702/119

* cited by examiner

*Primary Examiner* — Amine Riad
(74) *Attorney, Agent, or Firm* — Schwabe, Williamson & Wyatt, P.C.

(57) ABSTRACT

Embodiments are generally directed to a protocol aware testing engine for high speed link integrity testing. An embodiment of a processor includes a processing core for processing data; and a protocol aware testing engine, wherein the protocol aware testing engine includes a protocol aware packet generator to generate test packets in compliance with an IO protocol, and a packet aligning and checking unit to align test packets generated by the packet generator with returned test packets and to compare the generated test packets with the returned data packets.

17 Claims, 7 Drawing Sheets

| | Byte +0 | Byte +1 | | | | | | | | Byte +2 | | | Byte +3 | | |
|---|---|---|---|---|---|---|---|---|---|---|---|---|---|---|---|
| | FMT | TYPE | R | TC | R | ATTR | R | TH | TD | EP | ATTR | AT | LENGTH | | |
| | 0x01 | 0x00 | 0 | 0x0 | 0 | 0 | 0 | 0 | 0 | 0 | 0x0 | 0 | 0x004 | | |
| Byte+4 | REQUESTER ID | | | | | | | | TAG | | | | Last BE | First BE | |
| | 0xBCC4 | | | | | | | | 0x73 | | | | 0xf | 0xf | |
| Byte+8 | Address[63:32] (Programmable) | | | | | | | | | | | | | | |
| | 0x0000_007D | | | | | | | | | | | | | | |
| Byte+12 | Address[31:2] (Programmable address generator) | | | | | | | | | | | | | | R |
| | 0xE200_C1C0 | | | | | | | | | | | | | | |
| Byte+16 | Data payload (Programmable) | | | | | | | | | | | | | | |

Fig. 4

PROTOCOL AWARE TESTING ENGINE FOR HIGH SPEED LINK INTEGRITY TESTING

TECHNICAL FIELD

Embodiments described herein generally relate to the field of testing of electronic systems and, more particularly, a protocol aware testing engine for high speed link integrity testing.

BACKGROUND

As electronic device development continues to advance, the speeds of high speed serial links are approaching 20 Gbits/sec (gigabits per second). Examples include the USB™ (Universal Serial Bus) speeds of 10 GT/sec (gigatransfers per second), Thunderbolt Lightning technology reaching 20 GT/sec, and other developing technologies.

However, these speeds create new challenges because testing individual components that communicate with each other using these high-speed serial connect technologies in isolation generally is not a viable option. At these high speeds, the board interconnect margins, the impact of leading processes (14 nm, 10 nm) on signal eye width and height, and temperature impact on the margins all play crucial roles in reliable communication, thereby complicating the testing operation.

BRIEF DESCRIPTION OF THE DRAWINGS

Embodiments described here are illustrated by way of example, and not by way of limitation, in the figures of the accompanying drawings in which like reference numerals refer to similar elements.

FIG. 4 illustrates an example data format for a test packet generated by a protocol aware packet generator according to an embodiment;

DETAILED DESCRIPTION

Embodiments described herein are generally directed to a protocol aware testing engine for high speed link integrity testing.

In some embodiments, an apparatus, system, or process provides for a protocol aware testing engine for high speed link integrity testing. In some embodiments, the protocol aware testing engine provides for generation of testing packets based upon a protocol of the system, for test packet aligning and checking for mismatch errors, and for generating log data based on the detected errors. In some embodiments, the protocol aware testing engine further provides for security to prevent unauthorized access to the generation of test packets and to the stored log data. Thus, the testing data is accessible only through a secure mechanism in the field, with access for external vendors being limited to registers to run the protocol aware testing engine.

In some embodiments, a secured protocol aware Smart Electrical Testing engine (SET), generally referred to herein as a protocol aware testing engine, resides in the CPU and such protocol aware testing engine is to send electrically stressing data packets across the platform to a connected device. In some embodiments, the data in the packets have special characteristics to electrically stress the links within the limits of the applicable protocol. In some embodiments, the protocol aware testing engine provides the ability to test the board connections between the host and device, and thus can assist a manufacturer in detecting board faults, such as faults caused by excessive capacitive loadings, before shipping the systems to end users. The protocol aware testing engine may be used to provide a low cost solution because the testing utilizes significant functional serial link data path to transmit and receive the data to and from the protocol aware testing engine.

In some embodiments, testing utilizing a protocol aware testing engine includes transmitting packets via a transmitter (Tx) to traverse downstream through the various protocol layers, the layers including transaction, link, and Phy layers, and finally through the analog transmitter, and then being launched onto the upstream layers for the receiver (Rx). In some embodiments, the testing operation is accomplished using one or more bridge (or loopback bridge) mechanisms. The loopback bridges are illustrated in FIGS. 1A and 1B. In some embodiments, the loopback bridge is incorporated in two locations: (i) on the platform following the Host (CPU) interface and (ii) on the device side at the analog logic layer.

In some embodiments, various electrical parameters may also be varied from testing run to testing run, including changes in voltage, frequency, PI (Phase interpolator settings), temperature (such as operation from −100 C to 900 C) that are deemed to be appropriate for the test and the type of the link under test. However, in some embodiments the process for high speed testing is not changed under these varying factors.

Figure 1:
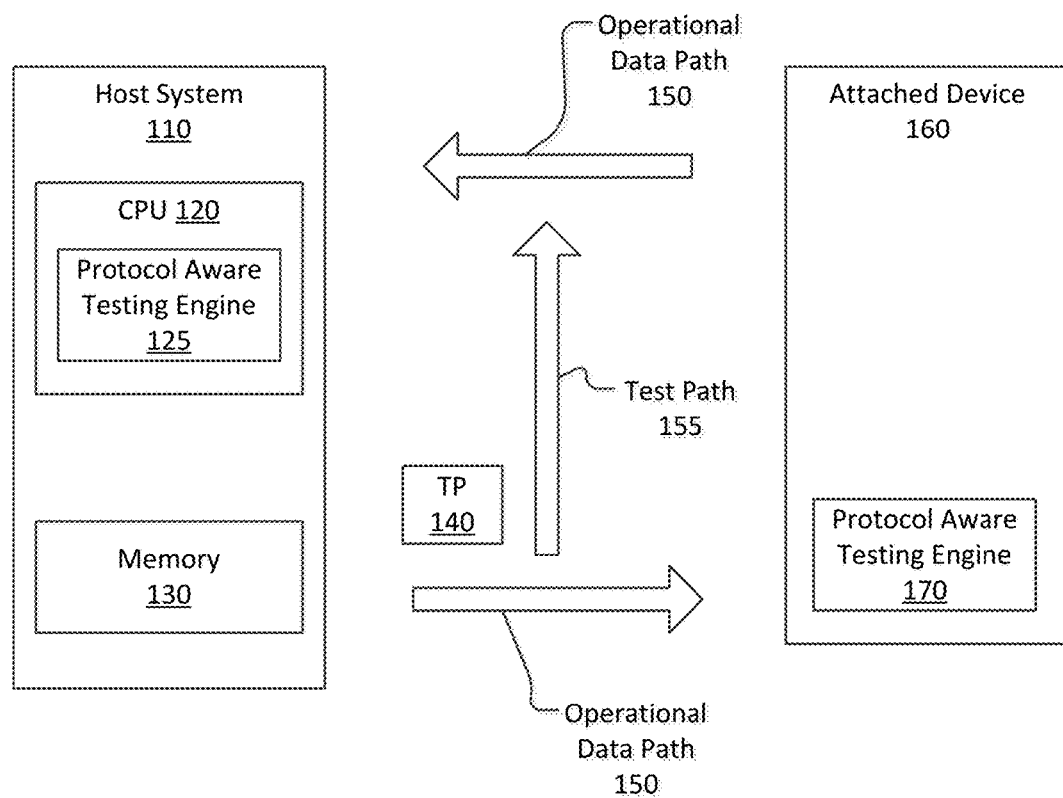
FIG. 1 is an illustration of operation of a system including a processor with a protocol aware testing engine for high speed interface testing according to an embodiment.

FIG. 1 is an illustration of operation of a system including a processor with a protocol aware testing engine for high speed interface testing according to an embodiment. In some embodiments, a host system 110 include a processing unit such as a CPU 120, the CPU including a protocol aware testing engine 125 for the testing of a high speed interface with an attached device 160 from the host side. The host includes other common elements of a host system, including computer memory 130. In some embodiments, the attached device 160 also optionally includes a protocol aware testing engine 170 for testing from the device side.

In some embodiments, the protocol aware testing engine is operable to generate test packets 140, wherein the test packets are generated to be compatible with an IO protocol for the interface. In some embodiments, the protocol aware testing engine is further operable to change a data path from an operational data path 150 to a test path 155, the test path including one or more loopback bridges to return the test packets 140 to the host 110. In some embodiments, the test path may include a first test path for on die testing and a second test path for device and board testing.

In some embodiments, the protocol aware testing engine 125 is further operable to compare the generated test packets with the returned test packets to allow high speed testing of the interface.

Figure 2A:
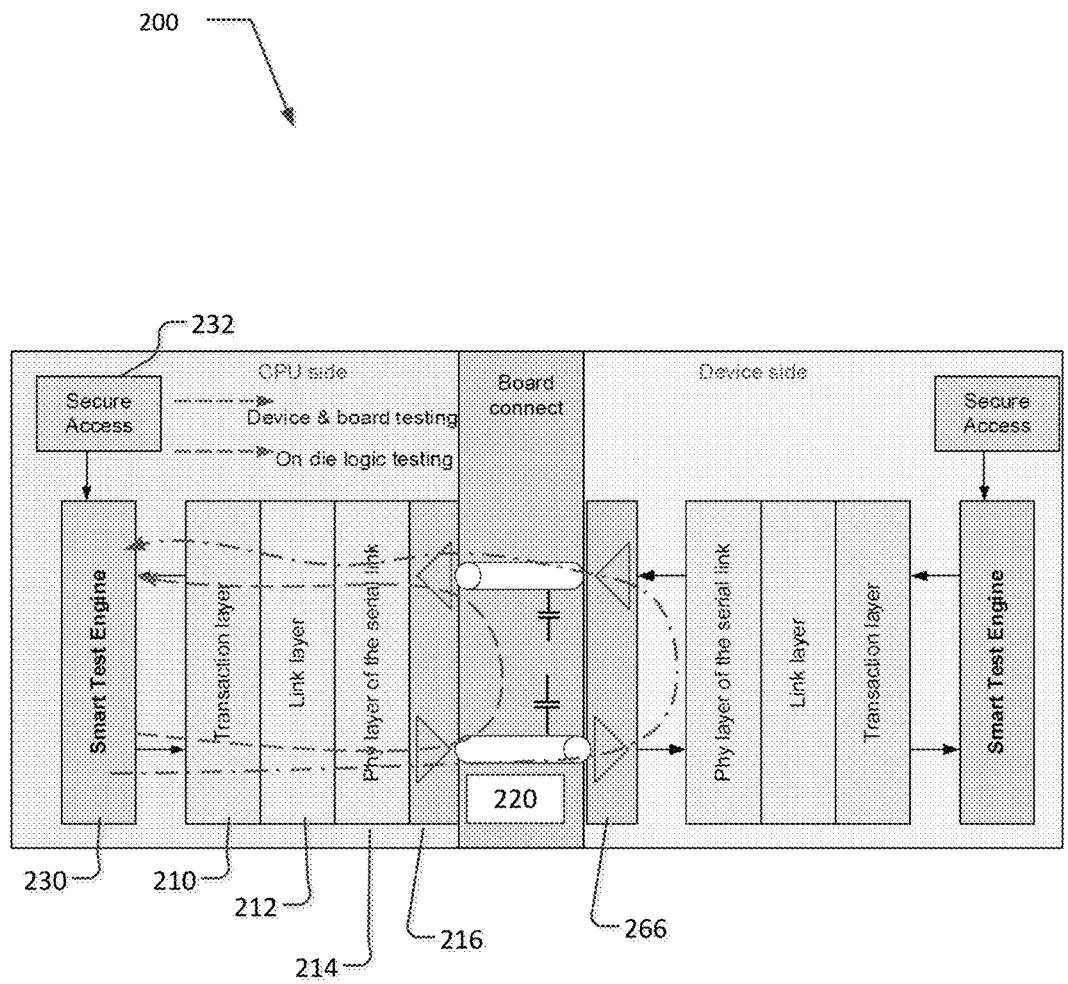
FIG. 2A is an illustration of a system including a protocol aware testing engine for testing of a connected board and device from a CPU side according to an embodiment.

FIG. 2A is an illustration of a system including a protocol aware testing engine for testing of a connected board and device from a CPU side according to an embodiment. As illustrated, a protocol aware testing engine 230 with secure access 232 is capable of testing of device and board testing and on die testing from the CPU side in a high speed environment utilizing a loopback test structure. In some embodiments, access to the protocol aware testing engine 230 is controlled through, for example an OEM (Original Equipment Manufacturer) security policy.

For on die testing from the CPU side of the connection, the loopback test structure enables the transmission of a test packet from the protocol aware testing engine 230 of the CPU through the transaction layer 210, the link layer 212, and physical layer of the serial link 214, with analog logic layer 216 enabling the return of the test packets at the board connect 220 back through physical layer of the serial link 214, the link layer 212, and the transaction layer 210, back to the protocol aware testing engine 230. The protocol aware testing engine 230 is to check for the errors on the data received from other side and is to flag the bit error rate or provide other error related information.

For device and board testing from the CPU side of the connection, the loopback test structure enables the transmission of a test packet from the protocol aware testing engine 230 of the CPU through the transaction layer 210, the link layer 212, and physical layer of the serial link 214, with analog logic layer 216 passing the test packets through the board connection 220 to analog logic layer 266 on the device side, which enables the return of the test packets back through the board connect 220, the physical layer of the serial link 214, the link layer 212, and the transaction layer 210, back to the protocol aware testing engine 230. The protocol aware testing engine 230 checks for the errors on the data received from other side and, for example, flags the bit error rate or provides other error related information.

Figure 2B:
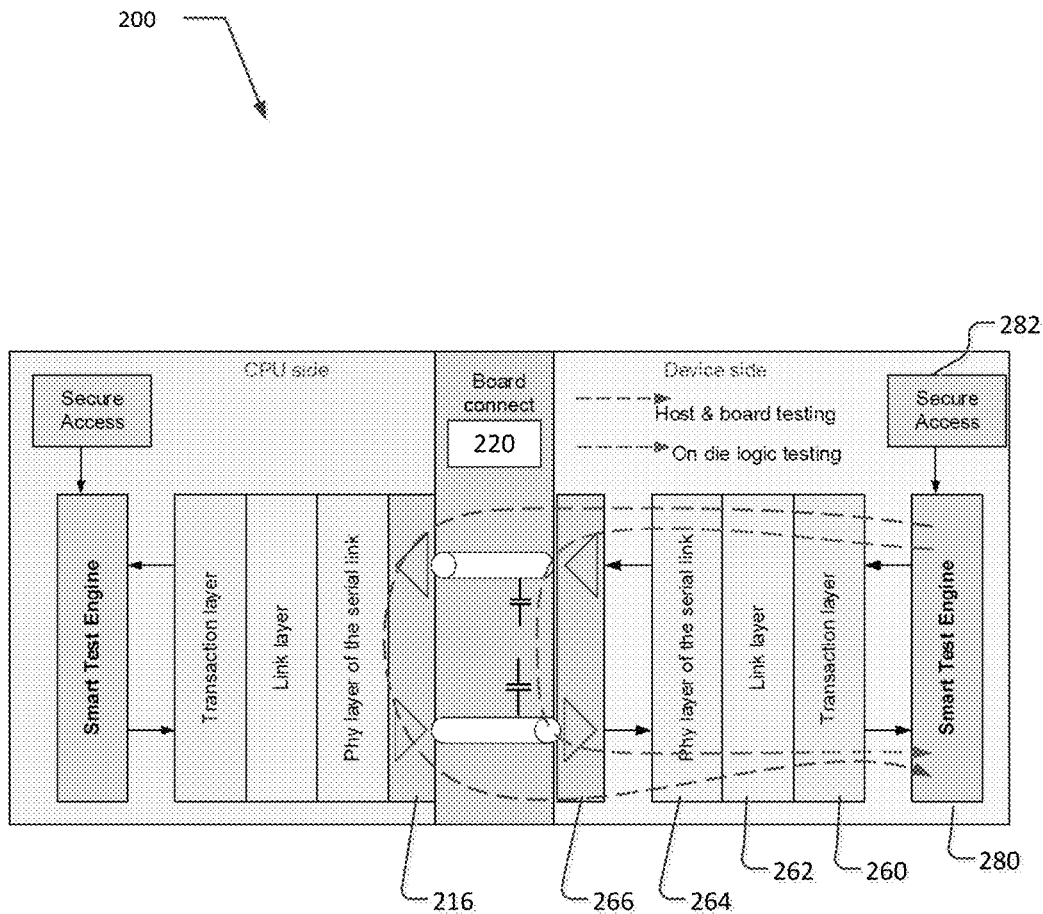
FIG. 2B is an illustration of a system including a protocol aware testing engine for testing of a connected board and host from a device side according to an embodiment.

FIG. 2B is an illustration of a system including a protocol aware testing engine for testing of a connected board and host from a device side according to an embodiment. In some embodiments, an engine similar to the protocol aware testing engine illustrated in FIG. 2A for the host (CPU) is deployed on the device side to provide coverage through the host.

As illustrated, a protocol aware testing engine 280 of a connected device with secure access 282 is capable of testing of device and board testing and on die testing from the device side in a high speed environment utilizing a loopback test structure.

For on die testing from the device side of the connection, the loopback test structure enables the transmission of a test packet from the protocol aware testing engine 280 of the connected device through the transaction layer 260, the link layer 262, and physical layer of the serial link 264, with analog logic layer 266 enabling the return of the test packets at the board connect 220 back through physical layer of the serial link 264, the link layer 262, and the transaction layer 260, back to the protocol aware testing engine 280. The protocol aware testing engine 280 is to check for the errors on the data received from other side and is to determine the bit error rate or other error related information.

For device and board testing from the device side of the connection, the loopback test structure enables the transmission of a test packet from the protocol aware testing engine 280 of the connected device through the transaction layer 260, the link layer 262, and physical layer of the serial link 264, with analog logic layer 266 passing the test packets through the board connection 220 to analog logic layer 216 on the CPU side, which enables the return of the test packets back through the board connect 220, the physical layer of the serial link 264, the link layer 262, and the transaction layer 260, back to the protocol aware testing engine 280. The protocol aware testing engine 280 again checks for the errors on the data received from other side and flags the bit error rate or other error data.

In some embodiments, a testing engine provides protocol aware operation to provide functional speed coverage for the host. This operation otherwise would not be available at the high speed operation that is required for modern electronics.

In some embodiments, a basic principle in the testing operation is that a secured access mechanism allows the protocol aware testing engine to be programmed for testing. In addition, the bridges to launch downstream data to the upstream data, shown as the arrows in the analog logic 216 and 266, are programmable using this secured mechanism.

Figure 3:
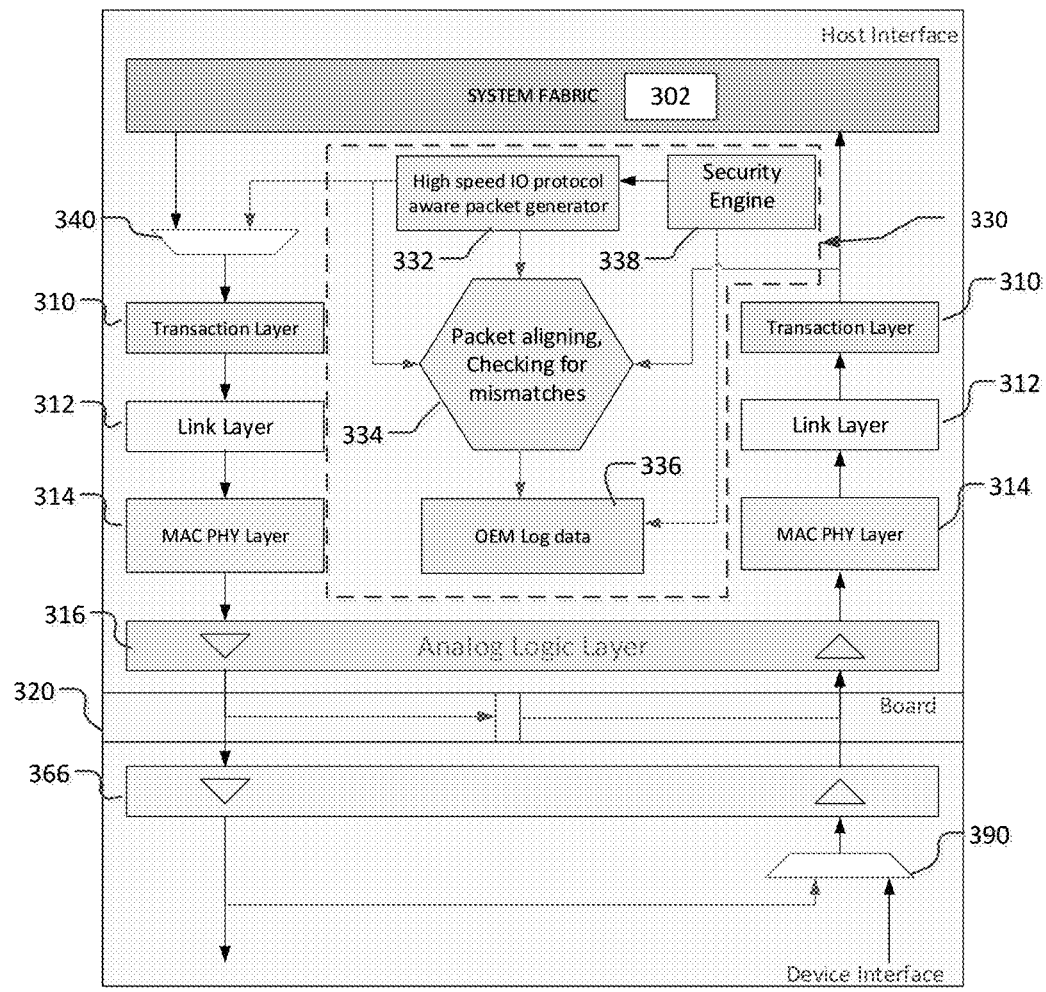
FIG. 3 is an illustration of a protocol aware testing engine according to an embodiment.

FIG. 3 is an illustration of a protocol aware testing engine according to an embodiment. As illustrated in FIG. 3, for a host interface to device interface connection, from a system fabric 302 an operational path provides for the transfer of data packets through the transaction layer 310, link layer 312, and the physical layer of the serial link 314 through the analog logic layer 316 to the board connect 320, and then through analog logic layer 366. There is also a return serial operational path through the board connection, analog logic layer, and the layers 314-310.

In some embodiments, a system includes a protocol aware testing engine 330, the testing engine including the following:

Packet Generator 332:

The protocol aware testing engine 330 includes a high speed IO protocol aware packet generator 332. In some embodiments, the packet generator, based upon a current IO protocol, is operable to generate test packets that are both compliant with the current protocol and are provided required stressing for on die testing and for device and board testing.

As illustrated, the packet generator 332 is operable to provide test packets to the transaction layer 310 via a logic element (or, or more generally, a switching structure) 340, shown in the illustration as a multiplexer, the logic element to switch between the operational path from the system fabric 392 to the testing path (applying the loopback bridges) in response to command.

In some embodiments, the protocol aware data generator 332 is responsible for generating header packets and data packets. These packets can embed several functional transactions, including, but not limited to: (i) Memory read (ii) Memory write (iii) Memory read lock operations.

Packet Aligning and Checking Unit 334:

The protocol aware testing engine includes a packet aligning and checking unit that is operable to align test packets that are generated by the packet generator 332 and packets that are returned along the test loopback structure, such as data from the transaction layer 310.

In some embodiments, returned packets are received at the packet aligning and checking module 334 and are compared against the expected packet data, with the module 334 to check for for data correctness and flag errors OEM analysis. Errors indicate that the link cannot reliably function at those testing conditions. In some embodiments, because of the protocol aware generation of testing packets, it is known that the testing is within the requirements of the applicable protocol.

Data Log:

In some embodiments, the protocol aware testing engine includes a data log to collect data for the high speed testing performed by the packet aligning and checking module 334, and thus to enable an OEM to analyze any failures of the link to reliably function under the testing conditions.

Security Engine 338:

In some embodiments, the protocol aware testing engine includes a security engine 338 to limit access to the packet generator 332 and the data log 336 to authorized persons or entities to ensure that the protocol aware testing engine 330 is not utilized to damage the system or to log operational data.

In some embodiments, the protocol aware testing engine 330 is operable to generate protocol aware data packets, wherein a protocol aware data packet is a test packet that provides required stress testing within a particular IO protocol. For example, in the case of PCIE (Peripheral Component Interconnect Express), a high performance I/O bus, the data packets are compliant to PCIE protocol. In case of Thunderbolt™, the data packets will adhere to the Thunderbolt protocol, and any other such protocol.

In some embodiments, a system further includes switching structures to enable or disable testing. The switching structures, such as 340 and 390, are represented as multiplexers. In testing mode the switching structures are responsible for routing the test packets instead of the native operational traffic. The downstream data packets may be launched to the upstream layers in two places: (i) on the board using a coupled link or (ii) through a device bridge loopback mechanism (such as in a graphics card).

FIG. 4 illustrates an example data format for a test packet generated by a protocol aware packet generator according to an embodiment. In some embodiments, the packet generator capabilities vary based on the protocol that the packet generator is implemented on. For example, a USB (Universal serial bus) protocol packet is different from that of the PCIE protocol packet.

In the illustrated example, the fields for a generated packet are as follows:

FMT: Format of the packet header, with example: 3 DW header, no data, 4 DW header with data etc.

Type: Packet type, Memory read request, Memory read request locked, etc.

TC: Traffic class of the packet.

ATTR: Attributes of the packet, Relaxed ordering, No-snoop etc.

R/TH/AT: Reserved fields.

TD: TLP (Transaction layer packet) digest field.

EP: Poisoned data, if set data accompanying this data should be considered invalid although the transaction is being allowed to complete normally.

Length: TLP data payload transfer size in DW (Double Words).

TAG: Identifies each outstanding request by the requester.

LastBE/FirstBE: Identifies valid bytes in the last DW and first DW respectively.

Address: Address of the transaction, we can generate this data with a programmable generator.

Data pay-load: A pseudo random data generator accompanies the packet when needed.

The data packet illustrated in FIG. 3 is merely one illustration, and the actual data fields are dependent on the appropriate protocol.

Figure 5:
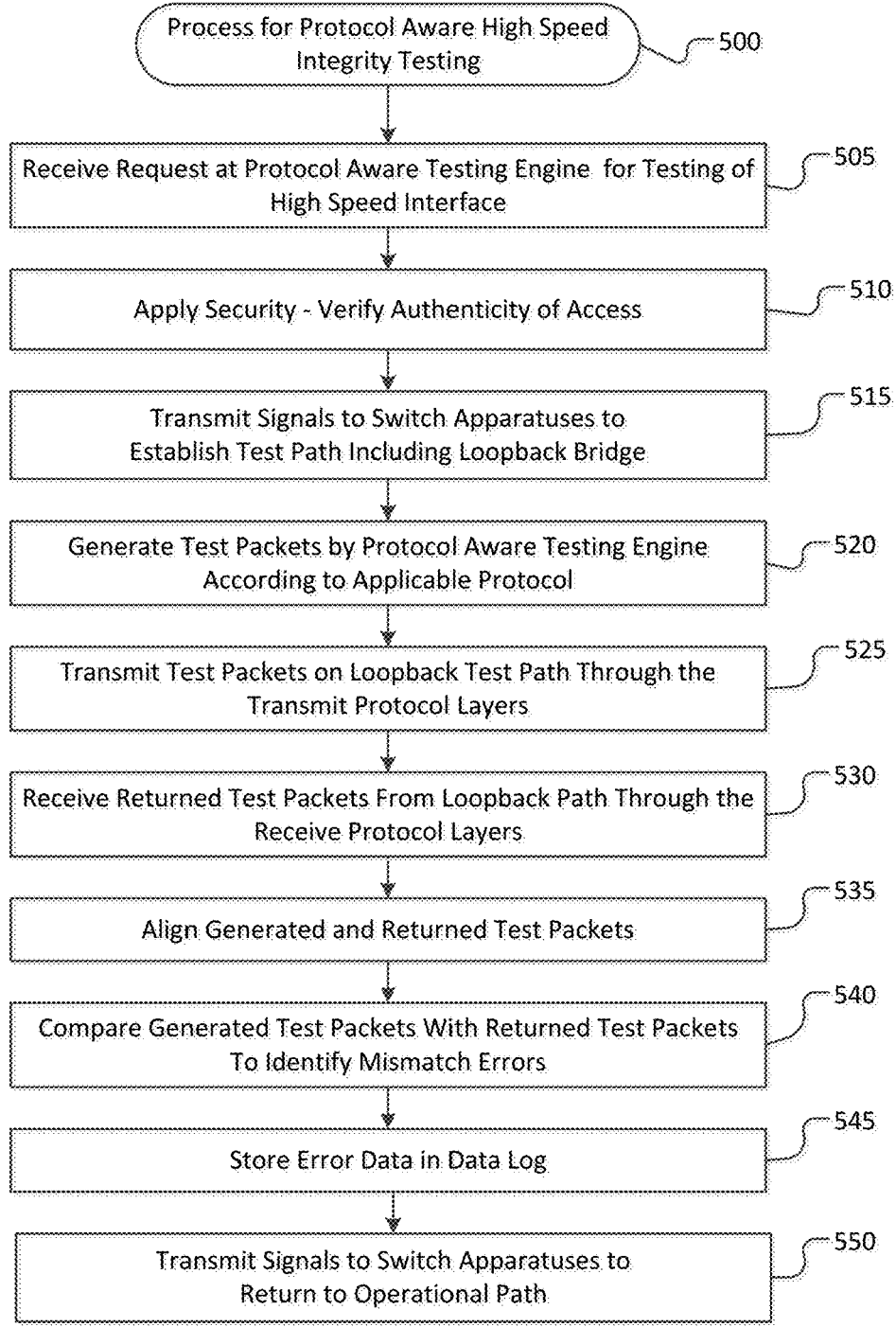
FIG. 5 is an illustration of a process for high speed integrity testing according to an embodiment.

FIG. 5 is an illustration of a process for high speed integrity testing according to an embodiment. In some embodiments, a process for high speed integrity testing includes the following:

505: Receiving a request at a protocol aware testing engine for testing of a high speed interface. In some embodiments, the protocol aware testing engine may include the testing engine 330 illustrated in FIG. 3.

510: Application of security including verifying authenticity of access to the protocol aware testing engine.

515: Transmit signals to switching structures to establish test path including loopback bridge for a test mode, i.e., changing from an operational mode to the test mode.

520: Generate test packets by the protocol aware testing engine according to the applicable IO protocol. The test packets are designed to stress the system with the requirements of the protocol.

525: Transmit the generated test packets on the loopback test path through the transmit protocol layers.

530: Receive returned test packets from the loopback test path through the receive protocol layers.

535: Align generated test packets and the returned test packets for high speed testing by the testing engine.

540: Compare the generated test packets and the received test packets to identify mismatch errors that are indicative of failure to properly handle the data.

545: Store data regarding the identified errors in a data log for evaluation of operation in the test mode.

550: After testing is concluded, the process may further include transmitting signals to the switching structures to return to the operational path, thus disabling the loopback bridge and switching from the test mode back to the operational mode.

Figure 6:
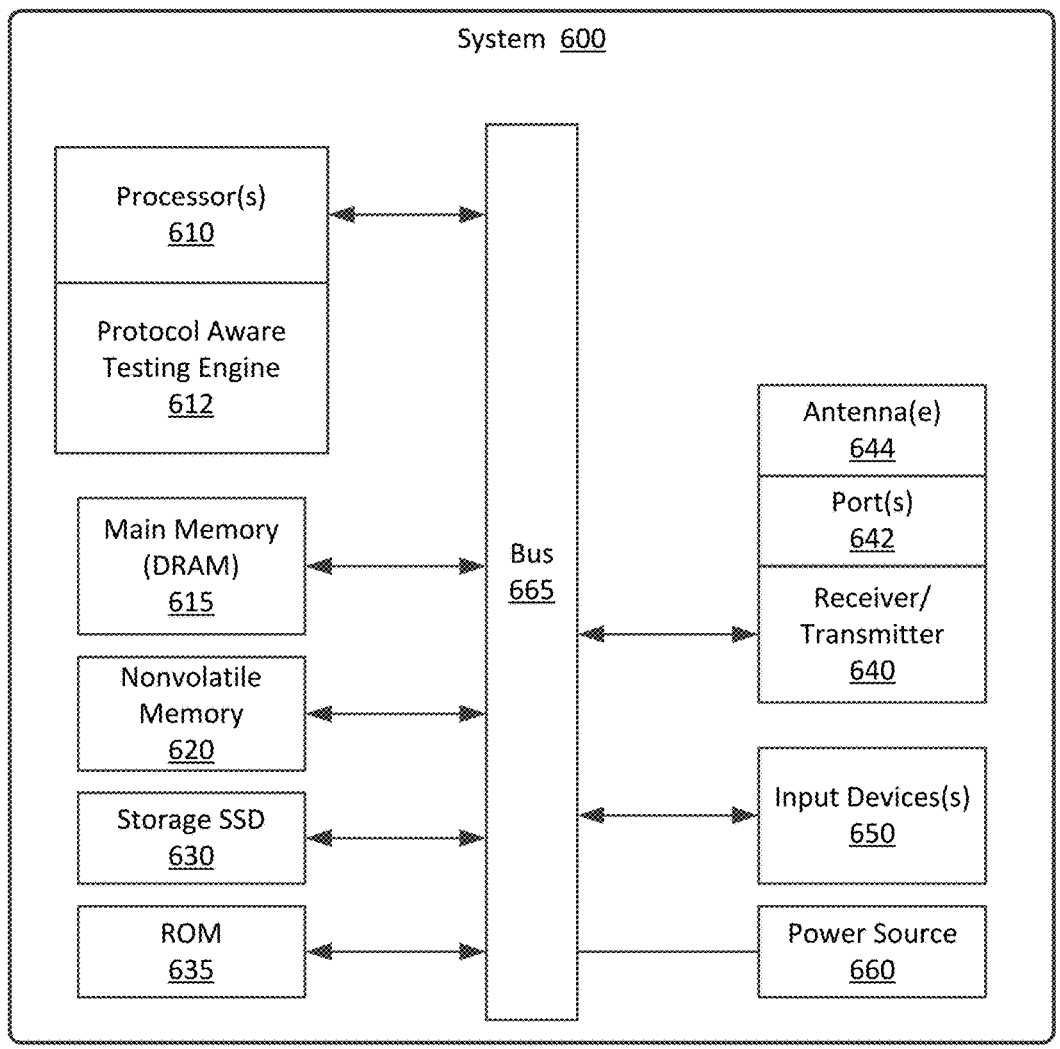
FIG. 6 is an illustration of a system including a protocol aware testing engine for high speed testing of an interface according to an embodiment.

FIG. 6 is an illustration of a system including a protocol aware testing engine for high speed testing of an interface according to an embodiment. In this illustration, certain standard and well-known components that are not germane to the present description are not shown. Elements shown as separate elements may be combined, including, for example, an SoC (System on Chip) combining multiple elements on a single chip.

In some embodiments, system 600 includes a processing means such as one or more processors 610 coupled to one or more buses or interconnects, shown in general as bus 665. The processors 610 may comprise one or more physical processors and one or more logical processors. In some embodiments, the processors may include one or more general-purpose processors or special-processor processors. A processor may include one or more processor cores.

In some embodiments, the processor includes a protocol aware testing engine 612 to enable high speed testing according to a particular IO protocol. In some embodiments, the protocol aware testing engine 612 is operable to control establishment of a test path including a loopback bridge for testing related to a connected device; generate test packets that are compliant with the IO protocol; transmit the test packets via the test path; receive returned test packets from the test path; align and compare the generated test packets with the received test packets; identify mismatch errors between the generated test packets and the received test packets that indicate errors in operation; generate data relating to the errors; and store the data related to errors in a data log.

The bus 665 is a communication means for transmission of data. The bus 665 is illustrated as a single bus for simplicity, but may represent multiple different interconnects or buses and the component connections to such interconnects or buses may vary. The bus 665 shown in FIG. 6 is an abstraction that represents any one or more separate physical buses, point-to-point connections, or both connected by appropriate bridges, adapters, or controllers.

In some embodiments, the system 600 further comprises a random access memory (RAM) or other dynamic storage device or element as a main memory 615 for storing information and instructions to be executed by the processors 610. Main memory 615 may include, but is not limited to, dynamic random access memory (DRAM).

The system 600 also may comprise a non-volatile memory 620; a storage device such as a solid state drive (SSD) 630; and a read only memory (ROM) 535 or other static storage device for storing static information and instructions for the processors 610.

In some embodiments, the system 600 includes one or more transmitters or receivers 640 coupled to the bus 665. In some embodiments, the system 600 may include one or more antennae 644, such as dipole or monopole antennae, for the transmission and reception of data via wireless communication using a wireless transmitter, receiver, or both, and one or more ports 642 for the transmission and reception of data via wired communications. Wireless communication includes, but is not limited to, Wi-Fi, Bluetooth™, near field communication, and other wireless communication standards.

In some embodiments, system 600 includes one or more input devices 550 for the input of data, including hard and soft buttons, a joy stick, a mouse or other pointing device, a keyboard, voice command system, or gesture recognition system.

In some embodiments, system includes an output display 655, where the output display 655 may include a liquid crystal display (LCD) or any other display technology, for displaying information or content to a user. In some environments, the display 655 may include a touch-screen that is also utilized as at least a part of an input device 650. Output display 655 may further include audio output, including one or more speakers, audio output jacks, or other audio, and other output to the user.

The system 600 may also comprise a battery or other power source 660, which may include a solar cell, a fuel cell, a charged capacitor, near field inductive coupling, or other system or device for providing or generating power in the system 600. The power provided by the power source 660 may be distributed as required to elements of the system 600.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, a processor includes a processing core for processing data; and a protocol aware testing engine, wherein the protocol aware testing engine includes a protocol aware packet generator to generate test packets in compliance with an IO protocol, and a packet aligning and checking unit to align test packets generated by the packet generator with returned test packets and to compare the generated test packets with the returned data packets.

In some embodiments, the protocol aware testing engine further includes a data log to store results of the comparison of the generated test packets with the returned data packets.

In some embodiments, the protocol aware testing engine further includes a security engine to restrict access to the packet generator and the data log to authorized persons and entities.

In some embodiments, the protocol aware testing engine is further to control one or more switching structures to switch data traffic between a test mode and an operational mode.

In some embodiments, the protocol aware testing engine is to control the one or more switching structures to create a first loopback bridge for testing of on die logic or a second loopback bridge for test of the host and connected device.

In some embodiments, the test mode includes a first test path for on die logic testing and a second data path for device and board testing.

In some embodiments, the protocol aware packet generator is to generate test packets to create stress conditions are in compliance with the protocol.

In some embodiments, a non-transitory computer-readable storage medium having stored thereon data representing sequences of instructions that, when executed by a processor, cause the processor to perform operations comprising receiving a request at a protocol aware testing engine of a host system for testing of a high speed interface in a test mode; generating test packets by the protocol aware testing engine according to an applicable IO protocol; transmitting generated test packets on a loopback test path for testing of the high speed interface; receiving returned test packets from the loopback test path; aligning the generated test packets and the returned test packets for high speed testing; and comparing the generated test packets and the received test packets to identify mismatch errors.

In some embodiments, the instructions further include storing data regarding the identified errors in a data log.

In some embodiments, the instructions further include applying security requirements for the protocol aware testing engine, including verifying authenticity of access to the protocol aware testing engine.

In some embodiments, the instructions further include transmitting signals to one or more switching structures to establish the test path for the test mode.

In some embodiments, the instructions further include, upon determining that testing is concluded, transmitting signals to the one or more switching structures to return to an operational path for an operational mode.

In some embodiments, generating the test packets includes generating test packages that are to stress the system within the requirements of the IO protocol.

In some embodiments, an apparatus includes means for receiving a request at a protocol aware testing engine of a host system for testing of a high speed interface in a test mode; means for generating test packets by the protocol aware testing engine according to an applicable IO protocol; means for transmitting generated test packets on a loopback test path for testing of the high speed interface; means for receiving returned test packets from the loopback test path; means for aligning the generated test packets and the returned test packets for high speed testing; and means for comparing the generated test packets and the received test packets to identify mismatch errors.

In some embodiments, the apparatus further includes means for storing data regarding the identified errors in a data log.

In some embodiments, the apparatus further includes means for applying security requirements for the protocol aware testing engine, including means for verifying authenticity of access to the protocol aware testing engine.

In some embodiments, the apparatus further includes means for transmitting signals to one or more switching structures to establish the test path for the test mode.

In some embodiments, the apparatus further includes means for transmitting signals to the one or more switching structures to return to an operational path for an operational mode upon determining that testing is concluded.

In some embodiments, generating the test packets includes generating test packages that are to stress the system within the requirements of the IO protocol.

In some embodiments, a system includes a processing unit; a high speed interface for connection to a connected device; and a protocol aware testing engine to test the apparatus and the connected device, wherein the protocol aware testing engine includes a protocol aware packet generator to generate test packets in compliance with an IO protocol, and a packet aligning and checking unit to align test packets generated by the packet generator with returned test packets and to compare the generated test packets with the returned data packets.

In some embodiments, the protocol aware testing engine further includes a data log to store results of the comparison of the generated test packets with the returned data packets.

In some embodiments, the protocol aware testing engine further includes a security engine to restrict access to the packet generator and the data log to authorized persons and entities.

In some embodiments, the system further includes one or more switching structures to switch data traffic between a test mode and an operational mode.

In some embodiments, the protocol aware testing engine is to control the one or more switching structures to create a first loopback bridge for testing of on die logic or a second loopback bridge for test of the host and connected device.

In some embodiments, the test mode includes a first test path for on die logic testing and a second data path for device and board testing.

In some embodiments, the protocol aware packet generator is to generate test packets to create stress conditions are in compliance with the protocol.

What is claimed is:

1. A processor comprising:
   a processing core for processing data; and
   a protocol aware testing engine;
   wherein the protocol aware testing engine includes:
      a protocol aware packet generator to generate test packets in compliance with an IO protocol, wherein the test packets are to create required stressing for on die testing and for device and board testing within requirements of the IO protocol, wherein the stressing comprises excessive capacitive loadings, and
      a packet aligning and checking unit to align test packets generated by the protocol aware packet generator with returned test packets and to compare the generated test packets with the returned data packets.

2. The processor of claim 1, wherein the protocol aware testing engine further includes:
   a data log to store results of the comparison of the generated test packets with the returned data packets.

3. The processor of claim 1, wherein the protocol aware testing engine further includes:
a security engine to restrict access to the packet generator and the data log to authorized persons and entities.

4. The processor of claim 1, wherein the protocol aware testing engine is further to control one or more switching structures to switch data traffic between a test mode and an operational mode.

5. The processor of claim 4, wherein the protocol aware testing engine is to control the one or more switching structures to create a first loopback bridge for testing of on die logic or a second loopback bridge for test of the host and connected device.

6. The processor of claim 4, the test mode includes a first test path for on die logic testing and a second data path for device and board testing.

7. A non-transitory computer-readable storage medium having stored thereon data representing sequences of instructions that, when executed by a processor, cause the processor to perform operations comprising:
receiving a request at a protocol aware testing engine of a host system for testing of a high speed interface in a test mode;
generating test packets by the protocol aware testing engine according to an applicable TO protocol, wherein the test packets are to create required stressing for on die testing and for device and board testing within requirements of the applicable TO protocol, wherein the stressing comprises excessive capacitive loadings;
transmitting generated test packets on a loopback test path for testing of the high speed interface;
receiving returned test packets from the loopback test path;
aligning the generated test packets and the returned test packets for high speed testing; and
comparing the generated test packets and the returned test packets to identify mismatch errors.

8. The medium of claim 7, further comprising instructions that, when executed by the processor, cause the processor to perform operations comprising: storing data regarding the identified mismatch errors in a data log.

9. The medium of claim 7, further comprising instructions that, when executed by the processor, cause the processor to perform operations comprising:
applying security requirements for the protocol aware testing engine, including verifying authenticity of access to the protocol aware testing engine.

10. The medium of claim 7, further comprising instructions that, when executed by the processor, cause the processor to perform operations comprising:
transmitting signals to one or more switching structures to establish the test path for the test mode.

11. The medium of claim 10, further comprising instructions that, when executed by the processor, cause the processor to perform operations comprising:
upon determining that testing is concluded, transmitting signals to the one or more switching structures to return to an operational path for an operational mode.

12. A system comprising:
a processing unit;
a high speed interface for connection to a connected device; and
a protocol aware testing engine to test the system and the connected device;
wherein the protocol aware testing engine includes:
a protocol aware packet generator to generate test packets in compliance with an IO protocol, wherein the test packets are to create required stressing for on die testing and for device and board testing within requirements of the IO protocol, wherein the stressing comprises excessive capacitive loadings, and a
packet aligning and checking unit to align test packets generated by the protocol aware packet generator with returned test packets and to compare the generated test packets with the returned data packets.

13. The system of claim 12, wherein the protocol aware testing engine further includes:
a data log to store results of the comparison of the generated test packets with the returned data packets.

14. The system of claim 12, wherein the protocol aware testing engine further includes:
a security engine to restrict access to the packet generator and the data log to authorized persons and entities.

15. The system of claim 12, further comprising:
one or more switching structures to switch data traffic between a test mode and an operational mode.

16. The system of claim 15, wherein the protocol aware testing engine is to control the one or more switching structures to create a first loopback bridge for testing of on die logic or a second loopback bridge for test of the host and connected device.

17. The system of claim 15, the test mode includes a first test path for on die logic testing and a second data path for device and board testing.

* * * * *